US006833025B2

(12) United States Patent
Håkansson et al.

(10) Patent No.: US 6,833,025 B2
(45) Date of Patent: Dec. 21, 2004

(54) COATING COMPOSITION FOR A PAPER AND PAPER COATED THEREWITH

(75) Inventors: Philip Håkansson, Sölvesborg (SE); Kilian Kleinhenz, Näsum (SE); Karen Sjölin, Falun (SE); Göran Ström, Bagarmossen (SE); Bengt Haugwitz, Bromölla (SE); Annette Forssten, Borlange (SE)

(73) Assignee: Stora Enso Aktiebolag, Falun (SE)

( * ) Notice: Subject to any disclaimer, the term of this patent is extended or adjusted under 35 U.S.C. 154(b) by 85 days.

(21) Appl. No.: 10/239,146

(22) PCT Filed: Mar. 13, 2001

(86) PCT No.: PCT/SE01/00517

§ 371 (c)(1), (2), (4) Date: Oct. 29, 2002

(87) PCT Pub. No.: WO01/71093

PCT Pub. Date: Sep. 27, 2001

(65) Prior Publication Data

US 2004/0067356 A1 Apr. 8, 2004

(30) Foreign Application Priority Data

Mar. 20, 2000 (SE) ............................................ 0000926

(51) Int. Cl.[7] ................................................ C09C 1/02

(52) U.S. Cl. .................... 106/465; 106/162; 106/217.2; 106/217.3; 106/272; 106/465; 106/468; 106/469; 106/471; 162/135; 162/136; 162/137; 205/204; 205/205; 205/206

(58) Field of Search ................................ 106/465, 468, 106/469, 471; 205/204–206; 162/135–137; 428/340–341

(56) References Cited

U.S. PATENT DOCUMENTS

| | | | | |
|---|---|---|---|---|
| 5,314,753 A | * | 5/1994 | Bergmann | 428/511 |
| 5,439,558 A | | 8/1995 | Bergmann et al. | |
| 5,449,402 A | | 9/1995 | Whalen-Shaw | |

FOREIGN PATENT DOCUMENTS

| | | |
|---|---|---|
| EP | 0 825 296 A1 | 2/1998 |
| WO | WO 98/20201 | 5/1998 |
| WO | WO 99/63157 | 12/1999 |

* cited by examiner

*Primary Examiner*—C. Melissa Koslow
*Assistant Examiner*—Shalie Manlove
(74) *Attorney, Agent, or Firm*—Nixon & Vanderhye

(57) ABSTRACT

Coating composition comprising mineral pigment, for creating a matt or silk coated paper with decreased ink scuff tendency. The coating composition also comprises organic particles, which particles in an amount of 0.5–9.5 weight-% calculated on said mineral pigment, exhibit a particle size of more than 2 μm and at the most 50 μm. The invention also relates to a paper which is coated with said coating composition.

45 Claims, No Drawings

COATING COMPOSITION FOR A PAPER AND PAPER COATED THEREWITH

TECHNICAL FIELD

The present invention relates to a coating composition comprising mineral pigment for coating of paper. The invention also relates to the use of particles in such a coating composition and a paper which exhibits a coating that comprises said coating composition.

TECHNICAL BACKGROUND

Papers of different types are quite often coated in order to improve the quality of the paper. A conventionally used coating composition for this purpose is a dispersion comprising pigments, which pigments normally are inorganic, such as mineral pigments, but sometimes also organic. The coating composition may also comprise other additives.

Paper intended for printing, such as paper for illustrating books magazines, brochures and annual reports is quite often manufactured by coating a base paper in one or more coating units, followed by soft calendering. The final product matt or silk coated fine paper, will then exhibit a paper gloss of between 10 and 50% (measured for example with a Zehnter instrument angle 75 degrees). The used coating colours or coating compositions, are composed in a fairly conventional way, which means that the dominant pigments are calcium carbonate and clay. The mixing ratio varies from 0% to about 50%, preferably from 10% to about 50% of clay and even more preferred from 10% to about 40% of clay, the rest essentially being calcium carbonate. For a matt or silk coated paper at least 50% of the coating composition should consist of calcium carbonate, preferably at least 60% and even more preferred at least 70%. A ratio of 30% clay and 70% calcium carbonate is quite common. Also, talc may be used at a ratio of normally 5–15%.

Binders are normally used in a content of 8–15 parts per 100 parts inorganic pigments. Different types of latexes are normally used as binds but it is also common to use combinations of latex and water-soluble starch or just starch as a binder. The types of latexes could be all types of common latexes used for pigment coating on paper and board such as different copolymers based on styrene, butadiene, acrylates and methacrylates. As thickener and viscosity regulator water soluble polymers are used, for example carboxy methyl cellulose (CMC) of different molecular weights, derivatives of polyacrylates, polyvinyl alcohol, derivatives of polyacrylamid, starch etc. The amount is adjusted to reach a viscosity level suitable for coating with the referred coating techniques. Also, other additives, such as optical brighteners, dispersion agents, anti foaming agents, lubricants, etc may be used in the coating. The solids content of the coating composition is dependent on the type of coating composition and coating technique used, but is conventionally 55–70 weight percent.

Matt and silk coated fine papers suffer from a severe problem which occurs in the bookbindery or the like. This problem constitutes of transfer of ink from pictures and text to unprinted areas of the paper, which makes the paper look dirty. The problem occurs in various operations, such as folding and cutting, in the bookbindery or the like. The phenomenon has many names, but in the following the term "ink scuff" will be used.

The degree of ink scuff can be determined in the laboratory after full scale printing, using a special equipment that scuffs the black full tone area of primed paper against unprinted paper of its own. The transfer of ink is measured as a "rub-off" value, which for matt or silk coated fine papers usually lies between $6\cdot10^{-2}$ and $7\cdot10^{-2}$ after a drying time of 6 hours in the paper pile.

It is known that an increased amount of clay in the used coating composition and/or an addition of talc and lubricants (such as calcium stearate or waxes) in the coating composition will reduce ink scuff to some extent. The reduction achieved thereby is however in many cases not sufficient.

From EP 447 471 it is known to use starch grains in a coating composition for matt paper, in an amount of from 10 to 65% by weight based on its overall solids content. It has however been shown that matt paper coated accordingly exhibit unacceptably low print gloss.

From DE 26 05 575, it is known to use large amounts of starch in a latex coaxing which is especially developed for bank-notes, in order to fulfil the very special requirements for bank-notes.

From EP 825 296, it is known to use a coating composition comprising porous organic particles in an amount of 3–14% with a particle size of from 1.0 to 10 μm. The object of the invention according to EP 825 296 is to provide a matte finished coated paper that has a surface coating of a pigment but is similar in appearance to an uncoated paper, which is superior in dot reproduction and is capable of developing colours clearly and setting inks for a short time and which has a coating that is resistant to scratch marks when scratched by something. Decreased ink scuff is however not an objective.

From U.S. Pat. No. 5,439,558 it is known to use a coating composition comprising starch granules in an amount of 2–25 weight % and with a particle size of 2–9 μm. Moreover, the coating composition comprises 40–65% calcium carbonate and the gloss is greater than 40% as measured at an angle of 75° according to Lehmann. The coated paper thus produced is not adapted for offset printing techniques and will thus not exhibit any ink scuff problems.

From WO 9920201 it is known to use a coating composition comprising at least 50% by volume hollow, organic polymeric particles with a particle size of about 1.0 to 5.0 μm. The coating is intended to be used for papers with high paper and print gloss.

DESCRIPTION OF THE INVENTION

It is an object of the present invention to present a new, improved coating composition for matt or silk coated papers, by use of which ink scuff may be considerably reduced at the same time as a good print gloss is achieved. The coated paper according to the invention is especially well adapted to be used in offset printing techniques.

Accordingly, the present invention presents a coating composition comprising mineral pigment for matt or silk coating of paper, which coating composition also comprises organic particles, which particles in an amount of 0.5–9.5 weight-% calculated on said mineral pigment, exhibit a particle size of more than 2 μm and at the most 50 μm (normally the diameter).

According to one aspect of the invention, said organic particles, in an amount of 0.5–9.5 weight-%, preferably 0.5–5 weight-% and even more preferred 1–4 weight-% calculated on said mineral pigment, exhibit a particle size of more than 2 μm and at the most 50 μm, preferably 40 μm at the most, and even more preferred 30 μm at the most.

According to another aspect of the invention, said particles comprise or consist of one or more organic compounds preferably carbohydrates or hydrocarbons. Furthermore, the particles should be insoluble in water at temperatures up to 40 or 50° C. Preferred carbohydrates are starch and most preferred maize starch or derivatives of maize starch. A specially preferred derivative of maize starch is manufactured by Emsland-Stärke GMBH under the trade name Emdrin 1020. Most preferred hydrocarbon products are paraffin waxes and polyethylene waxes. Specially preferred hydrocarbons are Paraflint Spray 20 (paraffin wax from Sch ümann SASOL) and Acumist B12 (polyethylene wax from Allied Signals).

The particles are suitably water dispersible and are preferably non abrasive, i.e. they exhibit a low abrasivity. Moreover, the particles are non-porous, i.e. they consist of well dispersed, all through solid particles. It is believed, although the invention is not restricted to this theory, that the particles act as soft "spacers" in the composition and thus prevent the harder mineral pigment to scuff the printed areas of the paper.

The predominant content of the coating composition is normally the mineral pigment, which typically comprises calcium carbonate, clay and/or talc, in conventional amounts, such as have been previously specified. Thus, the coating composition may comprise 0–50% clay, preferably 10–50% and even more preferred 10–40% clay, and/or at least 50% calcium carbonate, preferably at least 60%, even more preferred more than 65% and most preferred at least 70% calcium carbonate. Also, the coating composition may comprise other conventional additives such as have been previously specified.

The invention relates to matt or silk coated fine papers, i.e. papers that have a single or top coating composition comprising a mineral pigment containing at least about 50% calcium carbonate and that exhibit a paper gloss of between 10 and 50%, preferably at least 10% but less than 40% and even more preferred less than 35% (measured for example with a Zehnter instrument, angle 75 degrees). Typically such papers exhibit a basis weight of 60–250 g/m$^2$. The coating composition can be used as a single coating or as a top cob the base paper being precoated once, or even as a top coating on a double or triple coated paper. The coating itself may be performed on-line, i.e. in the same line as the production of the base paper, or off-line, i.e. in a separate line for coating and calendering of reels of already produced base paper. The coating layer, consisting of or comprising the coating composition according to the invention, may exhibit a coat weight of 5–20 g/m$^2$ per side. Higher coat weights are preferred for single coatings and lower coat weights for top coating on precoated papers which have been precoated with one or two coating layers.

The coating technique which is used may differ, whereby e.g. blade coating with applicator roll, short dwell or jet flow application may be used. Instead of blade coating, roll coating or air brush coating could be used. Preferably, the coated paper is calendered at modest line pressures of 2–150 kN/m, preferably 30–100 kN/m. Suitably the calendering takes place in a soft/hard or soft/soft calendering nip, i.e. where at least one of the two calendering rolls in the nip, and preferably both of them, exhibit a relatively soft surface layer, such as a polymer. When calendering is performed in a soft/soft nip there is no heating of the calender rolls. When the calendering is performed in a soft/hard nip the hard steel nip could be heated to 40–90° C., preferably 50–80° C.

According to the invention there may be achieved a considerable lowering of ink scuff for matt or silk coated fine paper, compared with a reference coated paper, by use of the coating composition according to the invention. In some cases the coating composition according to the invention will result in a negative lowering of print gloss, as compared to reference. The negative effect on print gloss may however be remedied by soft/hard or soft/soft calendering the coated paper, while at the same time retaining the improved ink scuff tendency and a low paper gloss.

PILOT PLANT EXAMPLES

Ink scuff was determined with a GFL Rub Resistant Tester (GRT) where an unprinted paper is rubbed against a 100% black printing area on a primed paper of the same type as the unprinted paper, after 6 hours drying time in the pile of printed paper. The rubbing is performed in one single movement at constant speed (15 cm/min) and at a force of 15 N. The amount of ink transferred to the unprinted paper is characterized by Elrepho to obtain the rub-off value, which is defined as $\log(R_\infty/R)$, where $R_\infty$ is the reflectivity of an opaque pad of the recipient paper and R is the reflectance factor of the rub-off smear placed over a pad of the recipient paper.

In the following examples a woodfree paper of grammage 110 g/m$^2$, precoated with a calcium carbonate coating colour (10 g/m$^2$ per side), was top coated with a blade in a pilot coater equipped with an applicator roll.

The coating colours contained 11 parts of a styrene acrylate latex and 0.7 part CMC (carboxy methyl cellulose) as thickener. The solids content of the coating colours varied between 64–68%. Most of the coated papers were calendered in a soft-soft nip. The calendering pressure was 50–150 kN/m.

Full scale printing trials were performed in a Heidelberg Speedmaster using five printing units. The 100% black full one area was used for the ink scuff determinations and 4×100 full tone area for print gloss determination. Organic pigments according to Table 1 were used in the pilot plant examples. Data for the mineral pigments used in the examples are presented in Table 2.

TABLE 1

| Pigment | Trade name/ Manufacturer. | Particle size (Master sizer)[1] D90 μm | D50 μm | D10 μm |
|---|---|---|---|---|
| Maize starch | Emdrin 1020/ Emsland-Stärke Gmbh | 21 | 14 | 7.8 |
| Rice starch | Remy GF-diazo/REMY industries | 7.2 | 5.1 | 1.3 |
| Paraffin wax (C28–C130) | Paraflint Spray 20/Schümann Sasol Gmbh | 38 | 15 | 4.2 |
| Poly ethylene wax | Acumist B12/ Allied Signals | 37 | 20 | 10 |
| Paraffin wax blend*) | DCE 1977/Dussek Campbell Ltd | Particle size 0.5–2 μm (supplier data) | | |

*)Comparative example

[1]D90, D50 and D10 are the particle diameters at 90, 50 and 10 percentage points respectively from the cumulative volume distribution curve. The particle size distribution is determined with a Mastersizer Instrument (Malvern Instruments LTD), where the particle size distribution is determined with light scattering technique.

TABLE 2

| Pigment | Trade name/Manufacturer | Particle size (supplier data) |
|---|---|---|
| American clay | Mirragloss 91/Engelhard | 95–99% < 2 μm |
| American clay | Ultrawhite 90/Engelhard | 90–94% < 2 μm |
| Calcium carbonate | H90/Omya | 90% < 2 μm |

Pilot Trial A

In pilot trial A the coating speed was 200 m/minutes. Coating colours according to Table 3 were examined. Trial 1 is a reference example. The coat weight was 10 g/m$^2$ per side.

From table 3 it can be seen that ink scuff was improved for all trials, in relation to the reference. It can also be seen (trial 4) that a poor print gloss was achieved when the amount of maize starch was as high as 13%.

TABLE 3

| | | Coating composition % | | | Ink scuff (6 h) Rub- | Cal- en- | Paper | Print gloss |
|---|---|---|---|---|---|---|---|---|
| Trial | Clay Grade | Maize starch | H90 | Clay | off × 100 | der. kN/m | gloss % | % (4 × 100%) |
| 1 | A | 0 | 80 | 20 | 5.8 | 50 | 44 | 86 |
| 2 | A | 2.5 | 78.0 | 19.5 | 3.4 | 50 | 41 | 87 |
| 3A | A | 6.1 | 75.1 | 18.8 | 2.2 | 50 | 33 | 80 |
| 3B | A | 6.1 | 75.1 | 18.8 | 1.6 | 0 | 29 | 75 |
| 4*) | A | 13.0 | 69.6 | 17.4 | 2.3 | 0 | 25 | 67 |
| 5 | B | 2.4 | 78.0 | 19.5 | 3.5 | 0 | 33 | 82 |

*)Comparative example
A = Mirragloss 91.
B = Ultrawhite 90

Pilot Trial B

In pilot trial B the costing speed was 1000 minutes. Coating colours according to Table 4 were examined. Trial 6 and 11 are reference examples without organic pigments. The coat weight was 10 g/m$^2$ per side.

From table 4 it can be seen that ink scuff was improved for all trials in relation to the references at acceptable print glosses.

TABLE 4

| | | Coating composition % | | | Ink scuff (6 h) Rub- | Calen- | Paper | Print gloss |
|---|---|---|---|---|---|---|---|---|
| Trial | Clay Grade | Maize starch | Clay | H90 | off × 100 | der. kN/m | gloss % | % (4 × 100%) |
| 6 | A | 0 | 20.0 | 80.0 | 5.7 | 50 | 41 | 83 |
| 7 | A | 2 | 19.6 | 78.4 | 4.5 | 50 | 37 | 78 |
| 8 | A | 2.5 | 19.5 | 78.0 | 3.7 | 50 | 34 | 79 |
| 9 | A | 3.5 | 19.2 | 77.3 | 3.1 | 50 | 31 | 76 |
| 10 | A | 4.8 | 19.0 | 76.2 | 3.0 | 150 | 34 | 75 |
| 11 | A | 0 | 30.0 | 70.0 | 5.3 | 50 | 42 | 78 |

A = Mirragloss 91

Pilot Trial C

In pilot trial C the coating speed was 1000 m/minutes. Coating colours according to Table 5 were examined. The coat weight levels were between 6–10 g/m$^2$ per side. Trials 12, 18 and 20 are reference examples.

From table 5 it can be seen that ink scuff was improved for all trials, in relation to the references, except the comparative trial 22. The comparative trial, 22, shows that organic particles which are too small do not reduce ink scuff. From trial 19 it is clear that the inventive effect arises at higher contents of clay too. From trial 21 it is clear that the inventive effect arises in connection with the use of an organic pigment mixed into a coating composition which only contains calcium carbonate (besides other additives according to the above), and no clay. The effect is however not quite as good as when clay is present too. From trial 14 it is clear that rice starch too is an organic pigment which may give the effect according to the invention. The achieved ink scuff levels are however not as low as has been shown in trials A and B, which may be an indication that rice starch particles are too small. Accordingly, rice starch is not a preferred type of organic pigment according to the invention.

TABLE 5

| | coat | | Coating composition % | | | Ink scuff (h 6) |
|---|---|---|---|---|---|---|
| Trial | weight g/m$^2$ | Organic pigment Grade | Org. pigment | H90 | Clay*) | Rub-off × 100 |
| 12 | 10 | | 0 | 80 | 20 | 5.7 |
| 13 | 10 | Rice starch | 4.8 | 76.2 | 19.0 | 4.5 |
| 14 | 6.4 | " | 4.8 | 76.2 | 19.0 | 4.2 |
| 15 | 10 | Acumist B12 | 4.8 | 76.2 | 19.0 | 2.5 |
| 16 | 6 | " | 4.8 | 76.2 | 19.0 | 2.9 |
| 17 | 10 | Paraflint spray 20 | 3.8 | 76.9 | 19.2 | 4.3 |
| 18 | 10 | | 0.0 | 60.0 | 40.0 | 3.7 |
| 19 | 10 | Acumist B12 | 4.8 | 57.1 | 38.1 | 1.9 |
| 20 | 10 | | 0.0 | 100.0 | 0.0 | 6.4 |
| 21 | 10 | Acumist B12 | 4.8 | 95.2 | 0.0 | 4.6 |
| 22 | 10 | DCE wax**) | 3.8 | 76.9 | 19.2 | 6.0 |

*) = Mirragloss 91;
**) = paraffin wax with particle size 0.5–2 μm;
***) = comparative example.

The invention is not limited by the described embodiments but may be varied within the scope of the claims.

What is claimed is:

1. Coating composition comprising mineral pigment which to more than 65% comprises calcium carbonate, for creating a matt or silk coated paper, which coating composition also comprises organic particles in an amount of 0.5–9.5 weight-% calculated on said mineral pigment, said particles exhibiting a particle size of more than 2 μm and at most 50 μm, said particles comprising starch or paraffin wax, whereby said paper exhibits decreased ink scuff tendency.

2. Coating composition according to claim 1, wherein said particles are present in an amount of 0.5–9.5 weight-% based on said mineral pigment and exhibit a particle size of more than 2 μm and at most 40 μm.

3. Coating composition according to claim 1, wherein said particles are present in an amount of 0.5–5 weight-% based on said mineral pigment and exhibit a particle size of 30 μm at most.

4. Coating composition according to claim 1, wherein said particles are present in an amount of 1–4 weight-% based on said mineral pigment and exhibit a particle size of more than 2 μm and at most 40 μm.

5. Coating composition according to claim 1, wherein said particles are water dispersible.

6. Coating composition according to claim 5, wherein said particles are non-abrasive and non-porous.

7. Coating composition according to claim 1, wherein said starch is maize starch or a derivative of maize starch.

8. Coating composition according to claim 1, wherein said particles are insoluble in water at temperatures up to 50° C.

9. Coating composition according to claim 8, wherein said particles are insoluble in water at temperatures up to 40° C.

10. Coating composition according to claim 1,wherein said mineral pigment is the predominant content of the composition, and comprises one or more mineral pigments selected from the group consisting of calcium carbonate, clay, and talc.

11. Coating composition according to claim 1, wherein said mineral pigment comprises up to 30% clay and/or at least 70% calcium carbonate.

12. Coating composition according to claim 11, wherein said mineral pigment comprises 10–30% clay.

13. Coating composition according to claim 1, wherein the coating composition further comprises an additive selected from the group consisting of a binder, a thickener, an optical brightener, a dispersion agent, an anti foaming agent, a lubricant, and combinations thereof.

14. Coating composition according to claim 13, wherein the binder is a latex binder.

15. Coating composition according to claim 13, wherein the thickener is carboxy methyl cellulose.

16. Coating composition according to claim 1, wherein said mineral pigment comprises 80% at the most, of calcium carbonate, whereby said paper exhibits a paper gloss of between 10 and 50% (measured with a Zehnter instrument, angle 75 degrees).

17. Coating composition according to claim 16, wherein said paper exhibits a paper gloss of at least 10% but less than 40% (measured with a Zehnter instrument, angle 75 degrees).

18. Coating composition according to claim 16, wherein said paper exhibits a paper gloss of less than 35% (measured with a Zehnter instrument, angle 75 degrees).

19. Method of matt or silk coating of paper to reduce ink scuff, comprising coating paper with a composition comprising mineral pigment and organic particles in an amount of 0.5–9.5 weight-% based on said mineral pigment, said particles exhibiting a particle size of more than 2 μm and at most 50 μm.

20. Method according to claim 19, wherein said particles are present in an amount of 0.5–9.5 weight-% calculated on said mineral pigment and exhibit a particle size of more than 2 μm and at most 40 μm.

21. Method according to claim 19, said particles are present in an amount of 0.5–5 weight-% calculated on said mineral pigment and exhibit a particle size of 30 μm at most.

22. Method according to claim 19, wherein said particles are present in an amount of 1–4 weight-% calculated on said mineral pigment and exhibit a particle size of more than 2 μm and at most 40 μm.

23. Method according to claim 19, wherein said particles comprise an organic compound.

24. Method according to claim 23, wherein said compound is a carbohydrates or hydrocarbon.

25. Method according to claim 24, wherein said organic compound is a starch, paraffin wax or polyethylene wax.

26. Method according to claim 25, wherein said starch is maize starch or a derivative of maize starch.

27. Method according to claim 19, wherein said particles are insoluble in water at a temperature up to 50° C.

28. Method according to claim 27, wherein said particles are insoluble in water at a temperature up to 40° C.

29. Method according to claim 19, wherein said mineral pigment is the predominant content of the composition, and comprises one or more mineral pigments selected from the group consisting of calcium carbonate, clay, and talc.

30. Method according to claim 19, wherein said mineral pigment comprises 0–50% clay and at least 50% calcium carbonate.

31. Method according to claim 30, wherein said mineral pigment comprises 10–50% clay and at least 60% calcium carbonate.

32. Method according to claim 30, wherein said mineral pigment comprises 10–40% clay and at least 70% calcium carbonate.

33. Method according to claim 19, wherein the coating composition further comprises an additive selected in the group consisting of a binder, a thickener, an optical brightener, a dispersion agent, an anti foaming agent, a lubricant, and combinations thereof.

34. Method according to claim 33, wherein the binder is a latex binder.

35. Method according to claim 33, wherein the thickener is carboxy methyl cellulose.

36. Method according to claim 19, wherein said mineral pigment comprises at least 50% of calcium carbonate, whereby said paper exhibits a paper gloss of between 10 and 50% (measured with a Zehnter instrument, angle 75 degrees).

37. Method according to claim 36, wherein said mineral pigment comprises 80% at most of calcium carbonate.

38. Paper comprising a coating on at least one side thereof, which coating comprises a coating composition according to claim 1, in order to reduce ink scuff.

39. Paper according to claim 38, wherein said paper exhibits a basis weight of 60–250 $g/m^2$.

40. Paper according to claim 38, wherein said coating exhibits a coat weight of 5–20 $g/m^2$.

41. Paper according to claim 38, wherein said paper has been calendered at a line pressure of 20–150 kN/m.

42. Paper according to claim 41, wherein said paper has been calendered at a line pressure of 30–100 kN/m.

43. Paper according to claim 38, wherein said paper has been calendered in a calendaring nip where at least one of two calendaring rolls in the nip exhibit a soft surface layer.

44. Paper according to claim 43, wherein both calendaring rolls in the nip exhibit a soft surface layer.

45. Paper according to claim 43, wherein said soft surface layer is comprised of a polymer.

* * * * *